Aug. 23, 1960 R. J. WILLIS ET AL 2,950,032
REINFORCED MOLDED CONTAINER OF FLEXIBLE MATERIAL
Filed March 14, 1958 2 Sheets-Sheet 1

INVENTORS
Robert J. Willis
Charles J. McGraw

Attorneys

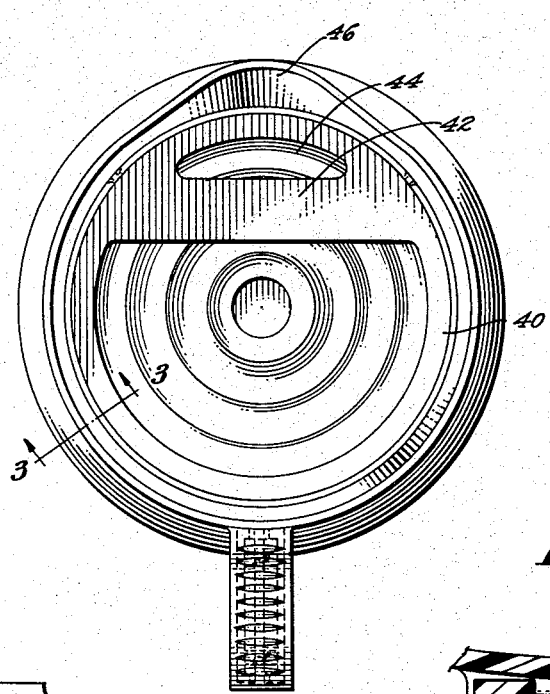
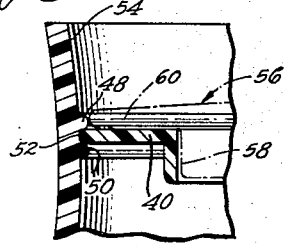
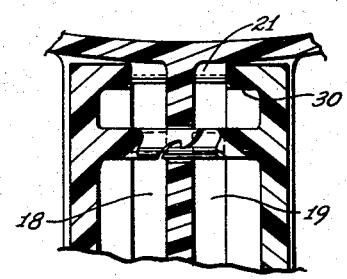
INVENTORS:
Robert J. Willis
Charles J. McGraw
Attorneys

United States Patent Office 2,950,032
Patented Aug. 23, 1960

2,950,032

REINFORCED MOLDED CONTAINER OF FLEXIBLE MATERIAL

Robert J. Willis, Woodland Hills, and Charles J. McGraw, Los Angeles, Calif., assignors, by mesne assignments, to The Plas-Tex Corporation, Los Angeles, Calif., a corporation of California Filed Mar. 14, 1958, Ser. No. 721,453

10 Claims. (Cl. 222—465)

This invention relates to molded plastic containers. The invention has particular application in the fabrication of large liquid containers molded from polyethylene and suitably reinforced by styrene or other rigid support members to enable the containers to hold their shapes when filled with liquid, especially when the containers are provided with handles for holding the same.

While polyethylene (of the "high pressure" type as distinguished from the "low pressure" type recently announced, and for which different characteristics are claimed) has been extensively employed in the manufacture of containers of various types, it has heretofore been regarded as an unsatisfactory material for the fabrication of larger containers which are intended to hold liquids, such as water, particularly where an attempt is made to provide handles or other supporting means extending externally from the walls of the container. Whenever such a large container, made of polyethylene, is filled with fluid, due to the flexible nature of the polyethylene, the weight of the fluid tends to cause the container to sag or distort—particularly about its point or points of support. This undesirable feature has, therefore, been responsible for limiting the use of polyethylene to relatively small fluid containers, or to larger containers which contain no handles, so that support must be provided by the fingers and palms of both hands of the user, thereby to minimize the distortion of the container, because of the distribution of the fluid weight over a large area or numerous points of support.

Any effort to vary the shaping of a large polyethylene container for liquids has heretofore required involved steps for providing reinforcement to the walls of the container, and such steps have disproportionately increased the expense of fabrication of the container to the point where the same cannot be marketed competitively with containers made from other more rigid materials. To fabricate large "open top" polyethylene containers of any sort, it has been necessary to make the container walls relatively thick to provide sufficient rigidity to the vessel. This fact, in itself, has increased the cost of manufacture of such containers, since a large proportion of the cost of manufacture is the polyethylene.

The present invention represents a solution of the problems thus presented in the use of flexible polyethylene for large size fluid containers, and enables such containers to be made inexpensively with open tops and with handles, and with thinner walls than are otherwise required where reinforcement in the manner herein taught is not incorporated in the container.

In the preferred embodiment of the invention, the container or vessel is formed with a circular horizontal cross section, and at an appropriate level near the top, a rigid annular member, fabricated of styrene or other similar rigid material, and of such an outside diameter as to fit snugly within said walls at said level, is inserted within the walls of the container and there retained by a pair of annular spaced apart ribs or beads which are molded integrally with the walls. The flexibility of the polyethylene enables this rigid annular member to be manually removed, so that the inside of the vessel may be cleaned, after which the rigid member may be replaced.

Vertical support for the walls may also be provided by molding a special type of handle integrally with the walls. This handle is shaped to present an oppositely disposed pair of vertically extending cavities or channels separated by an orificed wall, which cavities are adapted to receive and join in interlocking engagement with each other, a pair of rigid vertical elements. These cavities preferably are so formed as to bring a substantial portion of the rigid vertical elements into direct abutment with the outer wall of the vessel or container in the lower region of the latter. Interlocking of the vertical elements is accomplished by providing a series of horizontal bosses which extend from the backs of each of the two rigid vertical members, the opposing bosses on each element being matingly notched, so that when each pair of opposed bosses is brought together through an orifice in the handle wall, engagement occurs which serves to lock these two elements together at that point. The rigid vertical elements preferably extend upwardly to the level on the outside of the wall, at which level the rigid annular member is disposed within the walls defining the container cavity.

The details of the present invention are hereinafter set forth more fully in reference to the accompanying drawings, in which:

Figure 2 is a plan view of the pitcher from which the cover shown in Figure 1 has been entirely removed;

Figure 3 is an enlarged partial sectional detail taken on the lines 3—3 of Figure 2; and Figure 4 is a further enlarged sectional detail showing the manner in which the top pair of interlocking members is joined. This section is a horizontal cross section taken on the lines 4—4 of Figure 1 after the two exploded support members have been brought together and interlocked.

Figure 1:
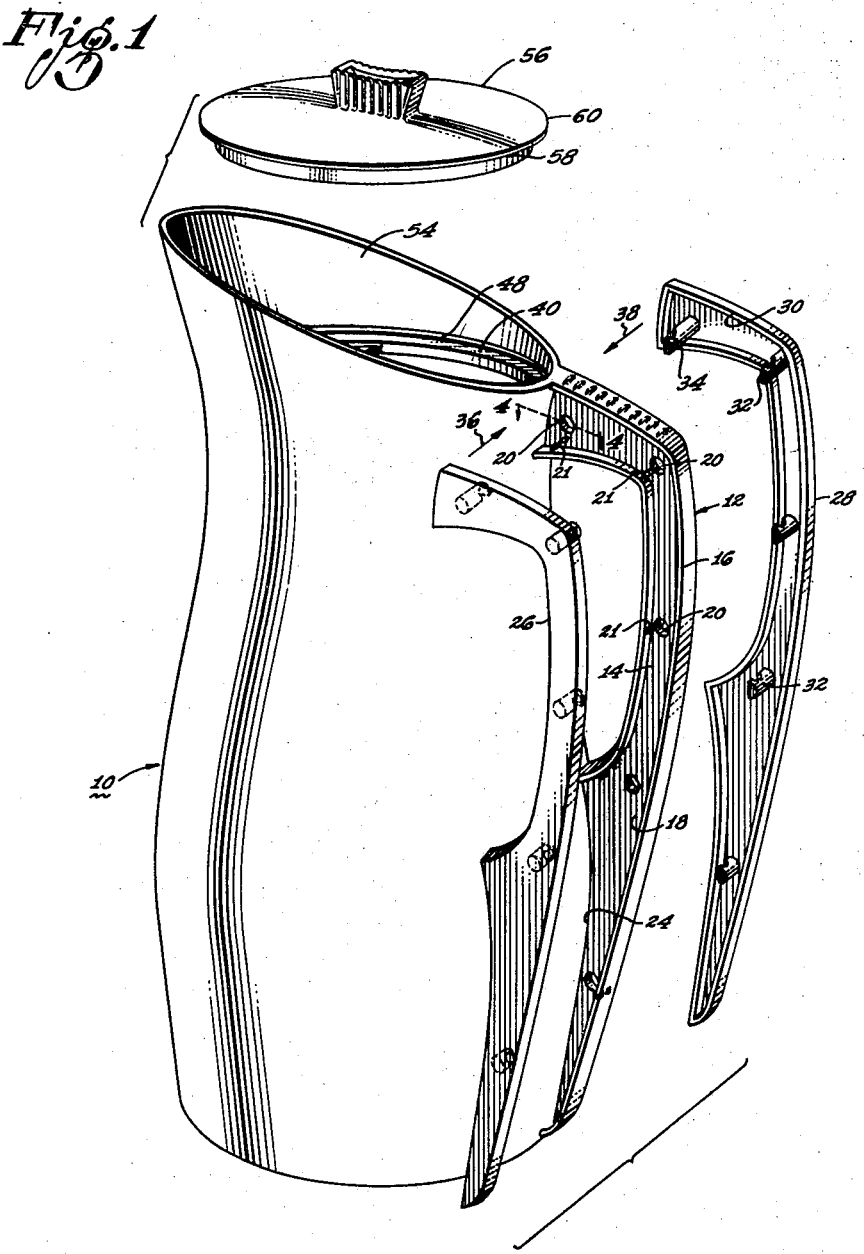
Figure 1 is a perspective view, partially exploded, showing the preferred embodiment of the invention in a pitcher suitable for dispensing iced liquids.

Referring to Figure 1, the invention in its preferred embodiment comprises a molded polyethylene pitcher body 10 of the shape illustrated, said body including, integrally molded therewith, a handle 12. The handle 12 preferably extends the full height of the back side of the pitcher body 10, being formed of a center wall 14 and two contoured members 15 and 16 which are also molded integrally with the wall 14 and extend for an equal distance normally to and on both sides of the wall 14 to define, with the latter, a pair of cavities 18 and 19 (Figure 4). The wall 14 is orificed at a series of points 20, and integrally molded with both the center wall 14 and the two contoured members 15 and 16, are a series of short semi-cylindrical ribs 21, each of which ribs 21 extends normally to the wall 14. Each pair of ribs is slightly greater in length than each preceding lower pair of ribs. It will be noted that the cavities 18 and 19, as thus defined, open onto the outer wall of the pitcher body 10 for a short distance at 22 and for a considerable portion of the total height of the pitcher, at 24. Some vertical support for the body is provided by the molded handle 12, but considerably greater support is afforded by providing a pair of rigid elements 26 and 28. These elements are preferably made of styrene, but any stiff material such as wood, aluminum, or other rigid plastic might be employed. Each of the rigid plastic elements 26 and 28 is shaped for seating within the cavities 18 and 19 respectively and is flanged at 30 inwardly about its entire periphery.

When each element 26, 28 is seated in its respective cavity 18, 19, its flange 30 abuts the outer ends of the ribs 21 in that cavity. To secure the styrene support elements 26, 28 in the cavities 18, 19, each said support element has integrally molded to the back side thereof a series of notched bosses 32 which are disposed in registry with the holes 20 in the wall 14. The notching 34 on each pair of opposing bosses 32 is mated so that when the two rigid members are brought together in the directions of the arrows 36 and 38 and seated in the cavities 18 and 19, the bosses interlock in the holes 20 in the manner shown in Figure 4. The altitude of each pair of bosses from their respective elements, is less than the altitude of the next higher pair of bosses. This decrease in altitude of the bosses, together with the decrease in the height of the ribs 21, which are molded within the cavity 14, and molding of the handle, result in a tapering toward the bottom of the two rigid support elements upon their joinder in the cavities in the manner above indicated. While it is not necessary that such tapering be provided, it has the advantage desirably of presenting the most rigid support to the body 10 along the area 24, and further coacts with the inner annular support in the region of the neck which is next described, to give the entire vessel a desired rigidity to enable it to hold a heavy liquid. This coacting support in the neck region of the pitcher, is provided by a styrene ring 40, shaped in the manner best shown in Figure 2, having a chord-like portion 42 which serves to hold back ice or other solid articles which may be contained in the liquid while allowing the liquid to pass through an opening 44 onto the pouring lip 46. The chord-like portion also serves to brace the ring.

The styrene ring 40 is preferably disposed slightly above the neck of the pitcher and is held in position by a pair of annularly extending beads 48 and 50 spaced axially from each other. These beads are integrally molded with the walls of the body 10 and define between them an annular channel 52. The ring 40 is made of such outside diameter as to fit snugly within the channel 52, and the bead 48 projects radially inwardly only a sufficient distance to hold the ring 40 in place in said channel. The lower bead 50 may be slightly larger to prevent the ring 40 from slipping through the neck and into the pitcher cavity.

It will be noted that the upper area 54 of the body 10 is flared outwardly, and the flexibility of the polyethylene permits the ring 40 to be forced past the bead 48 to seat in the channel 52. When it is desired to clean the inside of the pitcher, the upper area 54 of the pitcher may be flexed and the styrene ring pulled out of the channel and over the retaining bead 48. It should also be observed that the styrene reinforcing ring 40 is disposed in the neck of the pitcher at the same level as the upper extremities of the vertical styrene element 26, 28, thereby to coact therewith to provide rigid support in both the vertical and horizontal planes of these rigid elements at the points of intersection of these planes in the neck region of the pitcher body 10.

A cover 56 may desirably be provided to close the pitcher, such cover having a cylindrical portion 58 and a flanged upper rim 60, said rim being of such radius as to extend into close abutment with the bead 48.

A pitcher thus constructed may be manufactured in the following manner: The body 10 with the handle 12 is first molded to the construction described and illustrated. The styrene support members 26, 28 and 40 are separately molded and the two support members 26, 28 are then brought together back to back on each side of the wall 14, seated in the cavities 18, 19, and interlocked. In addition, the styrene ring 40 is pressed into the mouth of the pitcher over the bead 48, and seated in the channel 52. Thus, the reinforced polyethylene pitcher herein described and illustrated may be molded and assembled quickly and inexpensively. The cover may be provided as an optional item.

It may be seen that containers constructed according to the principles herein taught offer many advantages. The use of the rigid styrene ring in the neck area prevents squashing or other distortion of the cross-sectional area of the upper portion of the container. The handle, as thus constructed with the rigid vertical support members, not only affords particularly strong support along the area 24 where the edges of the support members 26 and 28 are brought into abutment with the outer wall of the pitcher, but the entire handle is given considerable rigidity. When rigidity in this respect is coupled with the rigidity provided by the styrene ring in the neck of the pitcher, it will be found that the molded shape of the pitcher is retained despite the considerable weight of liquid which may be contained in a pitcher, of, for example, a two quart size.

While the invention has been illustrated and described in its application to a pitcher for liquids, it is obvious that the basic principles of construction may be applied to many other types of polyethylene containers which are intended to be employed to hold quantities of liquids, the weight of which, in the absence of reinforcement according to the structure herein taught, may be such as to distort the shape of the container—particularly if it is desired to provide handles or other support members for the container. All such other variances are intended to be comprehended within the scope of this invention.

We claim:

1. A receptacle comprising: a thin-walled receptacle shell; a handle structure having its opposite ends united with said shell at an upper region and a lower region thereof, said shell being made of yielding pliable plastic material; and a reinforcement member extending around the inner circumferential surface of said shell at said upper region to stiffen the shell against deformation, said reinforcement member being positioned radially inwardly from the upper end of said handle structure, means to retain said member at a predetermined disposition within said inner circumferential surface of said shell, and said handle structure being connected with said shell in said upper region at two points of substantial spacing circumferentially of the shell whereby said reinforcement member lends rigidity to the handle structure relative to the shell.

2. A receptacle comprising: a thin-walled receptacle shell; a handle structure united with said shell at vertically spaced regions thereof and extending radially outward therefrom, said handle structure including an outer transverse web and an inner transverse web outlining the configuration of the handle, said webs being interconnected, said shell and handle structure being made of yielding pliable plastic material; a pair of reinforcements conforming to said configuration and spanning the space between said webs on opposite sides of the handle structure, said reinforcements cooperating with the edge portions of said webs for reinforcement of the webs by each other to lend rigidity to the handle structure itself, said reinforcements extending to the periphery of said shell to lend rigidity to the juncture of the handle structure and shell at said spaced regions; a reinforcement member extending around the inner circumferential surface of said shell at the upper of said two spaced regions in a position radially inward from the upper ends of said pair of reinforcements to reinforce the shell internally and to cooperate with said upper ends of the reinforcements to lend rigidity to the shell relative to the handle structure, and means to retain said reinforcing member at a predetermined disposition within said inner circumferential surface of said shell.

3. A container for liquids, said container comprising: a molded body of flexible material having sufficient rigidity to hold its molded shape in the absence of the application of internal and external forces to the walls of said body, said body having a bottom and relatively thin vertically directed walls molded integrally therewith to define a deep cavity adapted to receive and contain a liquid, such as water; said body further having molded integrally therewith a handle, said handle extending externally substantially from the bottom to the upper region of the walls, said handle further being formed of a flat vertical contoured portion lying in a plane through the axis of the container, said portion being provided on each of its edges with a pair of oppositely extending flanges, which, with said portion, form a pair of elongated channels, an element seated in each said channel and extending for the full extent thereof, each said element being formed of more rigid material than that of which the body is made, and means to secure each said element in its respective channel.

4. A container for liquids, said container comprising: a molded body of flexible material having sufficient rigidity to hold its molded shape in the absence of the application of internal and external forces to the walls of said body; said body having a bottom and relatively thin vertically directed walls molded integrally therewith to define a deep cavity adapted to receive and contain a liquid, such as water; a member formed to the horizontal cross section of said cavity in its upper region and disposed substantially horizontally within said walls at said region, said member being of more rigid material than that of which the body is made; said walls having means molded therewithin to receive and retain said member in such disposition; said body further having molded integrally therewith a handle, said handle extending externally substantially from the bottom to the upper region of the walls, said handle further being formed of a flat vertical contoured portion lying in a plane through the axis of the container, said portion being provided on each of its edges with a pair of oppositely extending flanges, which, with said portion, form a pair of elongated channels, an element seated in each said channel and extending for the full extent thereof, each said element also being formed of more rigid material than that of which the body is made, and means to secure each said element in its respective channel.

5. A container for liquids, said container comprising: a molded body of flexible material having sufficient rigidity to hold its molded shape in the absence of the application of internal and external forces to the walls of said body; said body having a bottom and relatively thin vertically directed walls molded integrally therewith to define a deep cavity adapted to receive and contain a liquid; a member formed to the horizontal cross section of said cavity in its upper region but spaced from the top edge of the walls and disposed substantially horizontally within said walls at said region, said member being of more rigid material than that of which the body is made, said walls having a pair of annular beads molded therewithin to receive and retain said member in such disposition; said body further having molded integrally therewith a handle, said handle extending externally substantially from the bottom to an area in the upper region of the walls radially outwardly of the said member, said handle further being formed of a flat vertical contoured portion lying in a plane through the axis of the container, said portion being provided on each of its edges with a pair of oppositely extending flanges, which, with said portion, form a pair of elongated channels, an element seated in each said channel and extending for the full extent thereof, each said element also being formed of more rigid material than that of which the body is made, and means to secure each said element in its respective channel.

6. A container for liquids, said container comprising: a molded body of flexible material having sufficient rigidity to hold its molded shape in the absence of the application of internal and external forces to the walls of said body; said body having a bottom and relatively thin vertically directed walls molded integrally therewith to define a deep cavity of circular cross section adapted to receive and contain a liquid, such as water; and an annular member of a diameter equal to the inside diameter of said cavity at a selected level in its upper region but spaced from the top edge of the walls and disposed substantially horizontally within said walls at said region, said member being of more rigid material than that of which the body is made, said walls having annular beadlike means molded therewithin to receive and retain said member in such disposition; said body further having molded integrally therewith a handle, said handle extending externally substantially from the bottom to the said level, said handle further being formed of a flat vertical contoured portion lying in a plane through the axis of the container, said portion being provided on each of its edges with a pair of oppositely extending flanges, which, with said portion, form a pair of elongated channels, an element seated in each said channel and extending for the full extent thereof, each said element also being formed of more rigid material than that of which the body is made, and means to secure each said element in its respective channel.

7. A container for liquids, said container comprising: a molded body of polyethylene having sufficient rigidity to hold its molded shape in the absence of the application of internal and external forces to the walls of said body, said body having a bottom and relatively thin vertically directed walls molded integrally therewith to define a deep cavity of circular cross section adapted to receive and contain a liquid, such as water; an annular member of a diameter equal to the inside diameter of said cavity at a selected level in its upper region but spaced from the top edge of the walls and disposed substantially horizontally within said walls at said region, said member being of styrene, said walls having annular beadlike means molded therewithin to receive and retain said member in such disposition; said body further having molded integrally therewith a handle, said handle extending externally substantially from the bottom to the said level, said handle further being formed of a flat vertical contoured portion lying in a plane through the axis of the container, said portion being provided on each of its edges with a pair of oppositely extending flanges, which, with said portion, form a pair of elongated channels, an element seated in each said channel and extending for the full extent thereof, each said element also being formed of styrene, and means to secure each said element in its respective channel.

8. In combination with a container molded of flexible plastic material, such as polyethylene, a handle molded integrally with the container, said handle also being of polyethylene and being formed of a flat vertical contoured portion lying substantially in a plane through the axis of the container and extending externally of the container from the bottom to the upper region of said container, said portion being provided on each of its edges with a pair of oppositely extending flanges which, with said portion, form a pair of elongated channels, said portion further being orificed at a series of points along its full extent, an element seated in each said channel and extending for the full extent thereof, each said element being formed of more rigid material than that of which the container and handle are made, and each said element being provided with a series of notched bosses horizontally extending from its back side and disposed in registry with the holes in said portion, whereby when said elements are brought back to back and separated only by said portion, the bosses interlock to secure said elements within their respective channels to reinforce the handle.

9. A receptacle, said receptacle comprising an open top shell defining a cavity, said shell being constructed of a molded flexible material of sufficient rigidity to hold its molded shape in the absence of the application thereto of internal or external forces; a rigid element, said element having a circumferential contour substantially coinciding with the contour of the inside of the upper region of said shell on a substantially horizontal plane, said inside of said region of the shell being provided with means formed to removably receive and retain said element, said element being inserted and retained within said shell to reenforce said shell against deformation by the application of said forces to the shell in said region, and said element being open centrally to permit fluid to enter and exit from the cavity.

10. A receptacle, said receptacle comprising an open top shell of circular cross-section and defining a cavity, said shell being constructed of a molded flexible material of sufficient rigidity to hold its molded shape in the absence of the application thereto of internal or external forces; an annular rigid element, said element having an outside diameter substantially coinciding with the inside diameter of the upper region of said shell on a substantially horizontal plane, said inside of said region of the shell being provided with a pair of annular beads spaced from each other movably to receive and retain said element, said element being inserted and retained within said shell to reenforce said shell against deformation by the application of said forces to the shell in said region, while allowing fluid to enter and exit from the said cavity.

References Cited in the file of this patent

UNITED STATES PATENTS

| | | |
|---|---|---|
| 304,743 | Milligan | Sept. 9, 1884 |
| 1,575,681 | Griffiths | Mar. 9, 1926 |
| 2,083,299 | Hunter | June 8, 1937 |
| 2,483,943 | Slawik | Oct. 4, 1949 |
| 2,620,006 | Sorron-Zabala | Dec. 2, 1952 |
| 2,793,670 | Schmidt | May 28, 1957 |
| 2,805,561 | Emmert et al. | Sept. 10, 1957 |